US008451594B2

(12) United States Patent
Kim et al.

(10) Patent No.: US 8,451,594 B2
(45) Date of Patent: May 28, 2013

(54) UNIVERSAL STAND FOR MULTIVISION (75) Inventors: Kunyoung Kim, Daegu (KR); Won Woo Jeon, Gumi-si (KR); Youngmi Kim, Gyeongsangbuk-do (KR)

(73) Assignee: Orion Co., Ltd., Gyeongsangbuk-Do (KR)

( * ) Notice: Subject to any disclaimer, the term of this patent is extended or adjusted under 35 U.S.C. 154(b) by 243 days.

(21) Appl. No.: 12/735,563

(22) PCT Filed: Apr. 14, 2009

(86) PCT No.: PCT/KR2009/001915
§ 371 (c)(1),
(2), (4) Date: Jul. 27, 2010

(87) PCT Pub. No.: WO2009/131327
PCT Pub. Date: Oct. 29, 2009

(65) Prior Publication Data
US 2010/0321917 A1 Dec. 23, 2010

(30) Foreign Application Priority Data
Apr. 22, 2008 (KR) .................. 10-2008-0037198

(51) Int. Cl.
*H05K 5/00* (2006.01)
(52) U.S. Cl.
USPC . 361/679.04; 361/810; 361/740; 361/679.05; 361/679.29; 361/829

(58) Field of Classification Search
USPC .................... 361/810, 740, 829, 758, 679.04, 361/679.05, 679.29; 248/298.1, 276.1
See application file for complete search history.

(56) References Cited

U.S. PATENT DOCUMENTS

| 2,980,381 | A | * | 4/1961 | Dectrow et al. | 248/223.21 |
| 5,671,124 | A | * | 9/1997 | Ho | 361/758 |
| 5,740,995 | A | * | 4/1998 | Richter | 248/220.21 |
| 2004/0196637 | A1 | * | 10/2004 | Le et al. | 361/758 |
| 2005/0178034 | A1 | * | 8/2005 | Schubert et al. | 40/605 |
| 2006/0238967 | A1 | * | 10/2006 | Carson et al. | 361/681 |

FOREIGN PATENT DOCUMENTS

| JP | 10-198286 | 7/1998 |
| JP | 2007-133155 A | 5/2007 |
| KR | 10-2003-0023951 A | 3/2003 |
| KR | 10-0523603 B1 | 10/2005 |

OTHER PUBLICATIONS

JP 1998-198286 English translation.*

* cited by examiner

*Primary Examiner* — Tuan T Dinh
*Assistant Examiner* — Steven Sawyer
(74) *Attorney, Agent, or Firm* — Head, Johnson & Kachigian, P.C.

(57) ABSTRACT

Provided is a universal stand for multivision for forming the multivision using a plurality of display devices. The universal stands includes: a plurality of base frames arranged horizontally and vertically in lines; and a support frame which is mounted on each of the base frames to move vertically or horizontally and supports the display device.

7 Claims, 13 Drawing Sheets

UNIVERSAL STAND FOR MULTIVISION

CROSS-REFERENCE TO RELATED APPLICATIONS

This application is a national phase application of PCT International Application No. PCT/KR2009/001915 which claims priority to Korean Patent Application No. 10 2008 0037198 filed Apr. 22, 2008.

FIELD OF THE INVENTION

This disclosure relates to a universal stand for multivision, and more particularly, a universal stand for multivision in which a plurality of small or medium display devices are mounted to form a large multivision.

BACKGROUND OF THE INVENTION

Multivision is a technique for forming a large screen by combining a number of display devices having small screens and used for a large screen in a showroom or karaoke, a display board, and the like. The number of the combined display devices can be changed depending on purposes.

Figure 1:
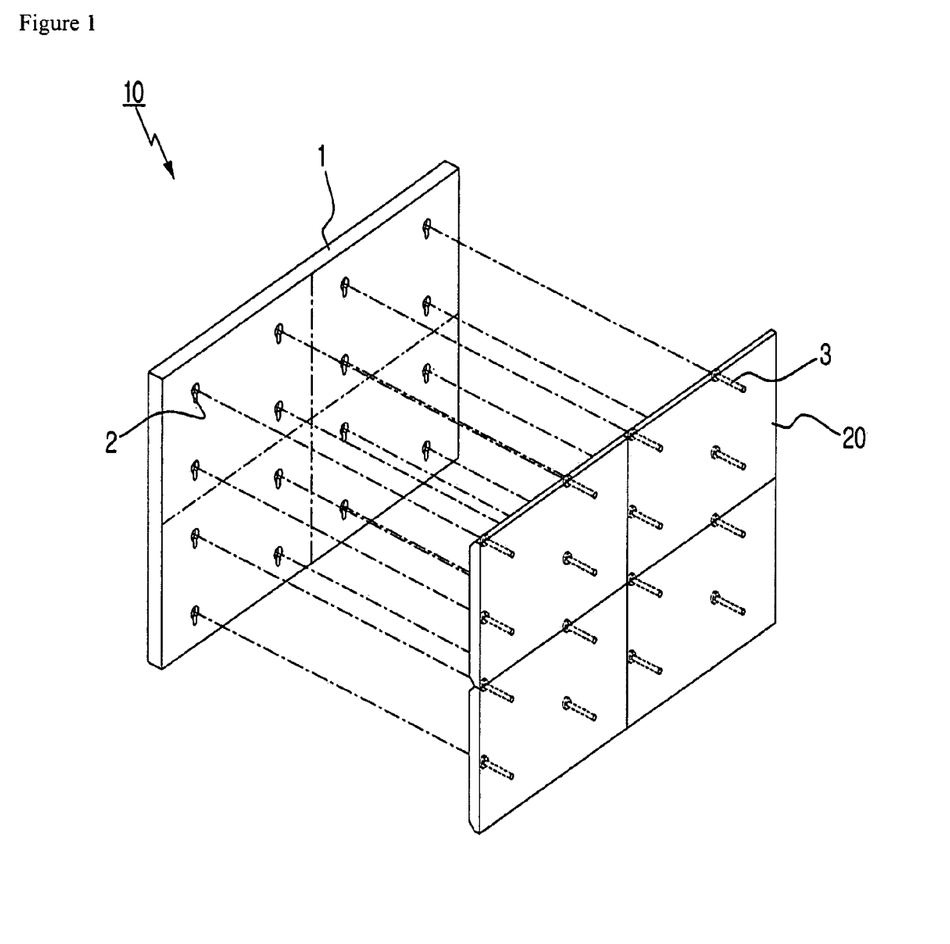
FIG. 1 is a perspective view illustrating a stand for multivision in a related art.

The multivision is formed by arranging and fixing a number of display devices on a stand. As illustrated in FIG. 1, an existing multivision stand 10 includes a base plate 1 having a number of locking holes 2 which are arranged and each of which has a wide upper portion and a narrow lower portion, and a support frame (not shown) for supporting the base plate 1.

A number of locking bolts 3 to be inserted into the locking holes 2 of the base plate are mounted on a rear surface of the display device 20. The diameter of a head portion of the locking bolt 3 is smaller than the upper diameter of the locking hole and larger than the lower diameter thereof, so that the locking bolt 3 can be inserted into the locking hole of the base plate 1, thereby mounting the number of display devices 20 to be attached to the base plate.

However, in the related art described above, due to characteristics of the multivision in which the display devices 20 are closely arranged, a margin space between the display devices during initial mounting is insufficient, and it is difficult to simultaneously insert the locking bolts 3 into the locking holes 3. Therefore, during mounting of the display devices and separation thereof for maintenance, work efficiency decreases significantly.

Due to the structure of the stand, the devices 20 are sequentially assembled from the bottom in order to closely arrange and fix the display devices 20. And, for disassembly, they are sequentially separated from the top. Accordingly, when the display device at the center is out of order and is to be replaced, there is a problem in that the adjacent display devices have to be disassembled together.

In addition, a dedicated stand with a suitable size has to be manufactured depending on the size and quantity of the display devices, and locking holes for mounting the display devices have to be punched individually. Therefore, there is a problem in that manufacturing cost of the stand increases.

DISCLOSURE

Technical Problem

This disclosure provides a universal stand for multivision which can be easily arranged and assembled according to the number of display devices used for the multivision, allow the adjustment of the positions of the display devices, and be easily attached to or detached from the display devices.

Technical Solution

In one aspect, there is provided a universal stand for multivision which supports a display device to enable a plurality of the display devices to be arranged to form a multivision, including: a base frame; and a support frame which is mounted on the base frame to move horizontally or vertically and on which the display device is mounted and supported.

In addition, the base frame may include a slide bar extending horizontally or vertically, and the support frame may include a nut through which the slide bar is inserted to move linearly.

In addition, the support frame may include a mounting hole into which a locking pin configured to protrude from a rear surface of the display device is inserted, in order to be engaged with the display device, and the mounting hole may include an insertion portion at the center, a first locking portion extending vertically from the insertion portion, and a second locking portion extending horizontally from the insertion portion to be perpendicular to the first locking protrusion.

In addition, an adjustment unit which is mounted on the support frame for precisely adjusting a vertical position of the display device may further be included. The adjustment unit may include: a fixing portion fixed below the mounting hole; and a vertical movement portion which is mounted on the fixing portion to move vertically and in contact with the locking pin of the display device.

In addition, a fixing bracket mounted in a gap between the display device and the support frame to fix the position of the display device may further be included.

In another aspect, there is provided a universal stand for multivision which supports a display device to enable a plurality of display devices to be arranged to form a multivision, including: a base frame; a support frame mounted on the base frame to move horizontally or vertically; and a fixing frame to which a display panel is attached and which is mounted and supported by the support frame.

In addition, position determination notches may be formed on a side surface of the fixing frame, and position determination protrusions corresponding to the position determination notches may be formed on the other side surface thereof.

Advantageous Effects

The universal stands for multivision according to the aspects can be arranged and assembled depending on the number of the display devices constituting the multivision, so that various types of multivision can be manufactured more easily.

The universal stand for multivision according to the aspects can be moved while the display devices are mounted. Therefore, individual assembling and disassembling is easy, and great effects can be exhibited with a small effort in terms of maintenance.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF THE EMBODIMENTS OF THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" ¡Ý and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising" or "includes" ¡Ý and/or "including" ¡Ý when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Figure 2:
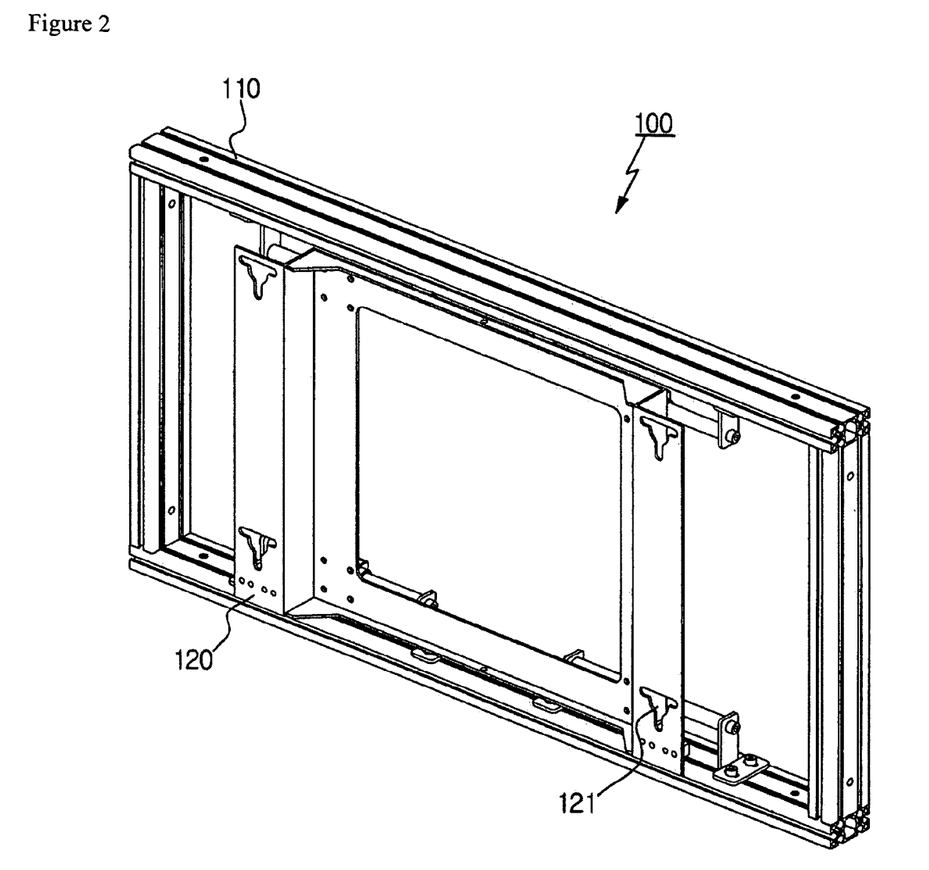
FIG. 2 is a perspective view illustrating a universal stand according to an embodiment.

FIG. 2 is a perspective view illustrating a universal stand according to an embodiment. As illustrated in FIG. 2, the universal stand 100 includes a rectangular base frame 110, and a support frame 120 which is mounted on the base frame 110 to move horizontally. A display device 200 is mounted in the support frame 120 (see FIG. 3).

Figure 3:
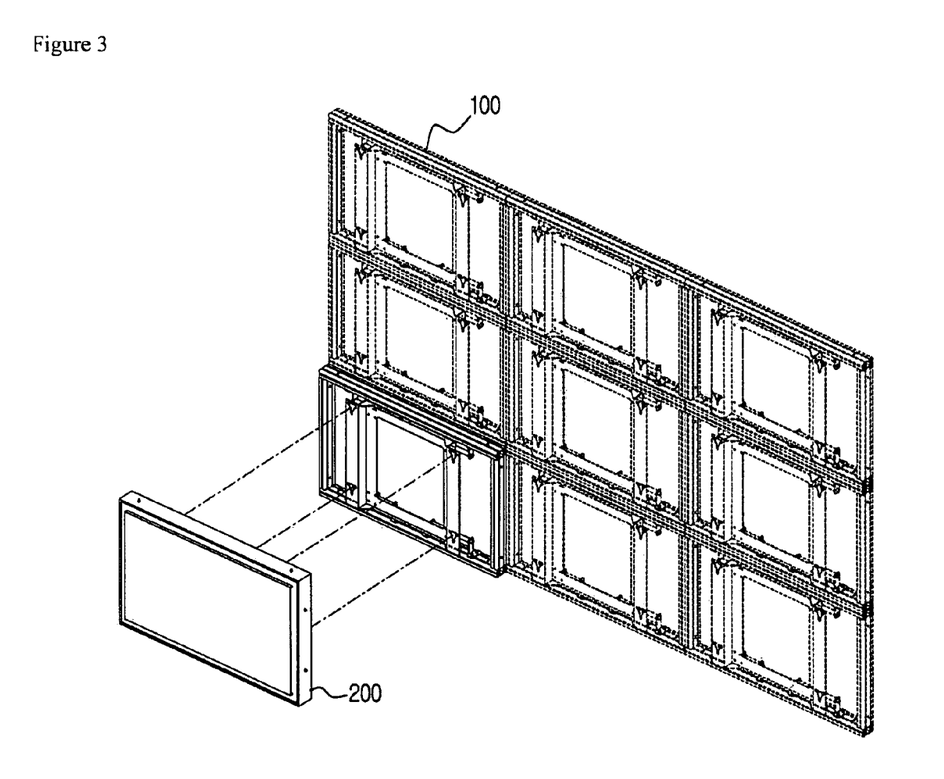
FIG. 3 is a perspective view illustrating multivision base frames which are arranged horizontally and vertically in lines.

As illustrated in FIG. 3, a plurality of the universal stands 100 may be arranged in a 3×3 array, and the display devices 200 are mounted on the corresponding stands 100, thereby forming a multivision. However, the arrangement is not limited thereto and may employ a 4×4 array or other arrays, depending on applications.

The universal stands 100 having the same shape are assembled to form a multivision and can be arranged simply depending on the number of panels for a desired multivision, thereby simply forming a multivision depending on the number of display devices.

The support frame 120 is mounted on the base frame 110 to move horizontally or vertically. Therefore, when the display device 200 is mounted in the support frame 120, the display device 200 may be moved horizontally or vertically to be closely fixed to the display device 200 of the adjacent universal stand 100, so that the adjacent display devices 200 may be closely attached to each other without a gap therebetween. In addition, when the display device 200 at the center position which is used for the multivision is out of order, only the broken display device 200 can be easily separated by moving the adjacent display devices 200 horizontally or vertically.

Figure 4:
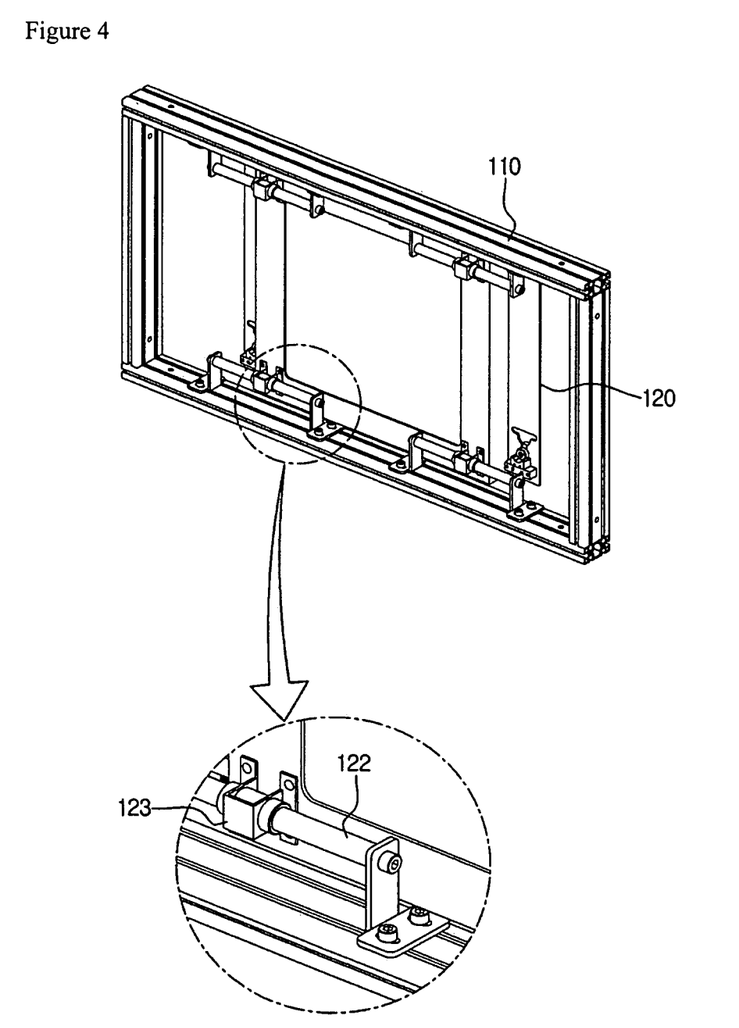
FIGS. 4 and 5 are perspective views illustrating a rear surface of a universal stand to show an example of a slide bar.

As illustrated in FIG. 4, in order to move the support frame 120 horizontally, the base frame 110 is provided with a slide bar 122. Two slide bars 122 are provided at each of right and left vertical frames of the base frame 110. In addition, the support frame 120 is provided with four nuts 123 each of which has a horizontal through-hole at its rear surface to be fastened to the slide bar 122. The slide bar 122 is assembled and mounted inside of the vertical fame of the base frame 110. Before mounting, the slide bar 122 is fastened to the nut 123 of the support frame 120, and the slide bar 122 is then fixed to the vertical frame. The slide bars 122 of the base frame 110 are inserted into the four nuts 123 of the support frame 120 to enable the nuts 123 to slide horizontally, so as to move the support frame 120 horizontally. The nuts 123 are provided with linear bearings (not shown) to enable the support frame 120 to move smoothly along the slide bar 122.

Figure 5:
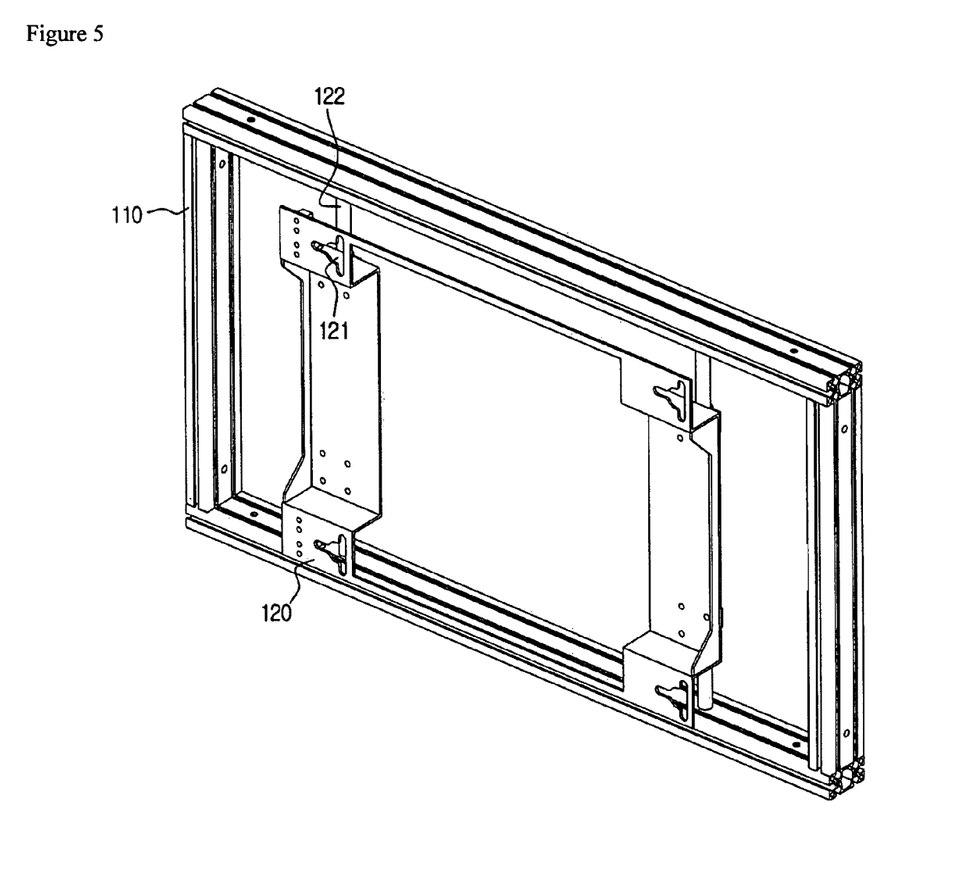

As illustrated in FIG. 5, according to another embodiment, the slide bar 122 may be mounted vertically. When the slide bar 122 is mounted vertically, the support frame 120 moves vertically.

As described above, by using the slide bar 122, the support frame 120 can be moved by way of a simple structure.

Figure 6:
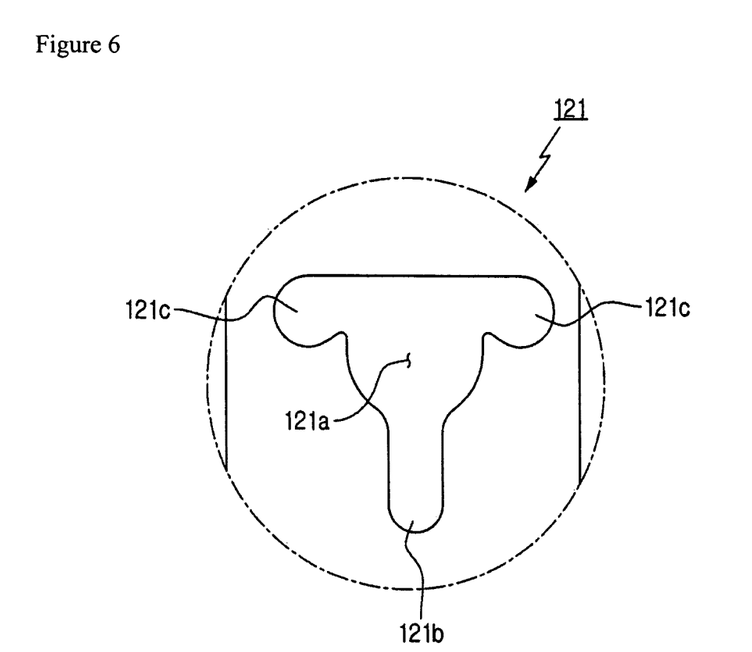
FIGS. 6 and 7 are schematic views illustrating an example of a mounting hole.
Figure 7:
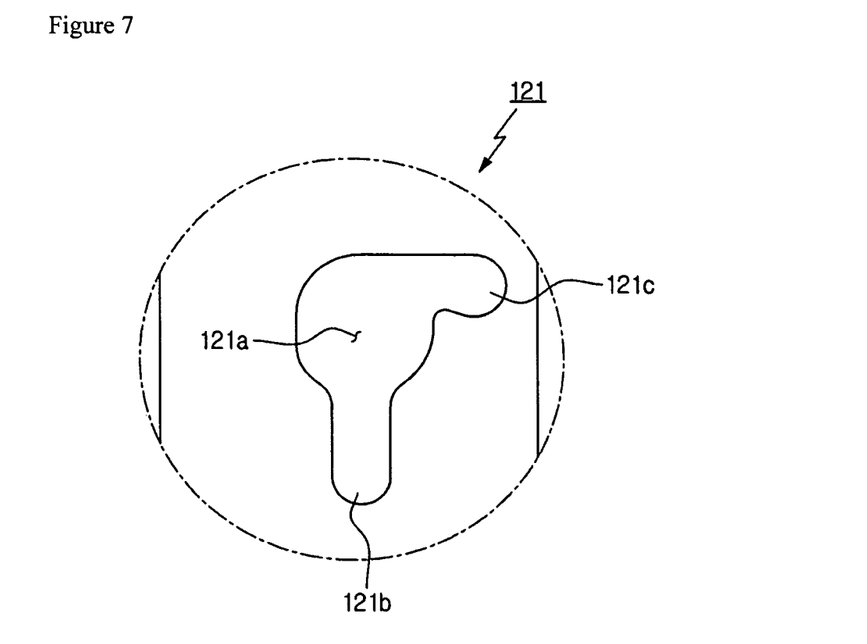

The support frame 120 is formed as a rectangular frame, and is provided with a mounting hole 121 for mounting the display device 200 at each of four corners of the support frame 120. The mounting hole 121 has approximately a T-shape. Specifically, as illustrated in FIG. 6, the mounting hole 121 includes an insertion portion 121a at the center, a first locking portion 121b extending downward from the insertion portion 121a in a slot shape, and second locking portions 121c extending horizontally from the insertion portion 121a to be perpendicular to the first locking portion 121b in a slot shape. According to still another embodiment, as illustrated in FIG. 7, the second locking portion 121c of the mounting hole 121 may extend from only a side of the insertion portion 121a such that the mounting hole 121 is formed in a substantially L-shape.

Figure 8:
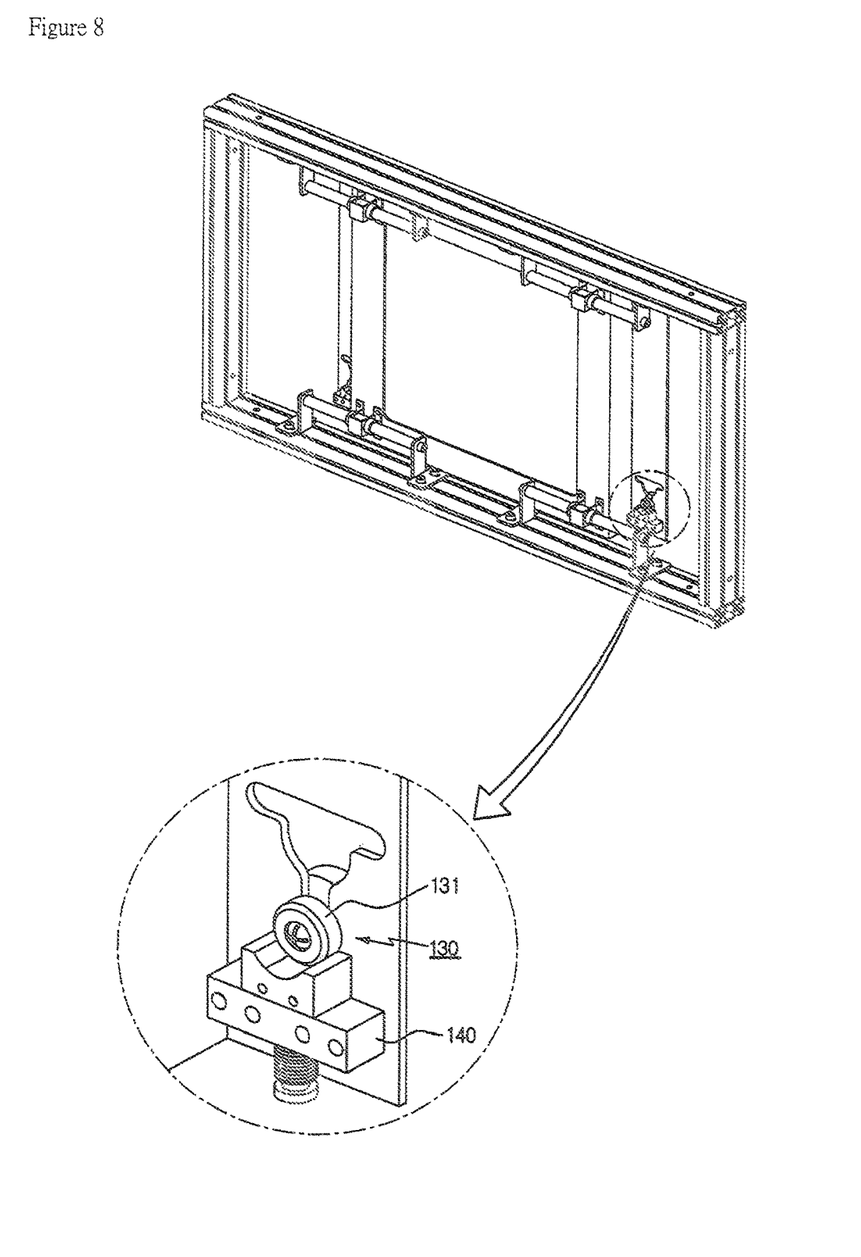
FIG. 8 is a view illustrating a state where a locking pin is fastened to the mounting hole.

As illustrated in FIG. 8, a locking pin 130 which is mounted to protrude from the rear surface of the display device 200 is inserted into the mounting hole 121. The locking pin 130 is inserted through the insertion portion 121a of the mounting hole 121 and is placed to the first locking portion 121b, so that the display device 200 may be supported by the support frame 120.

In order for the locking pin 130 to be inserted through the insertion portion 121a of the mounting hole 121 and engaged with the first locking portion 121b, the locking pin 130 has a head portion 131 with a diameter smaller than the diameter of the insertion portion 121 and larger than the width of the first locking portion 121b.

Figure 9:
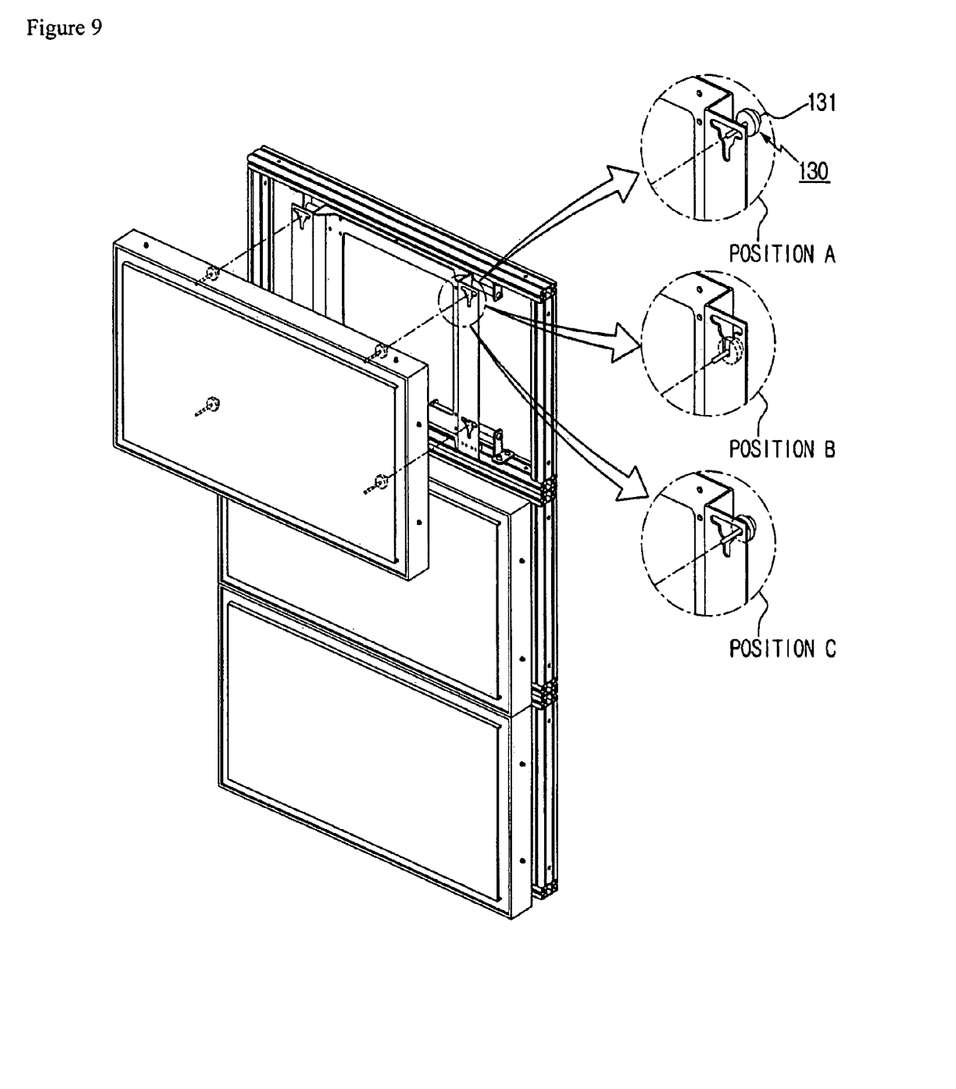
FIG. 9 is a view illustrating a state where a display device is fastened to the mounting hole.

FIG. 9 illustrates a process of mounting the display device 200 having the locking pin 130 fastened to the rear surface to the support frame 120 through the mounting hole 121.

As illustrated in FIG. 9, in order to mount the display device 200, the locking pin 130 of the display device 200 is aligned with the mounting hole 121 of the support frame 120 in a line, and the head portion 131 of the locking pin 130 is inserted into the insertion portion 121a of the mounting hole 121 (position A). In this state, when the display device 200 is pulled down, the locking pin 130 is moved to the first locking portion 121b of the mounting hole 121 (position B), and the display device 200 is fixed to the support frame 120. As described above, the display device 200 is designed to be fitted to the support frame 120 from the position A to the position B, that is, in a downward direction. Here, since the diameter of the head portion 131 of the locking pin 130 is larger than the width of the first locking portion 121b, the locking pin 130 does not deviate from the mounting hole 121, so that the display device 200 may be prevented from deviating from the support frame 120 undesirably.

When the display device 200 (for example, the display device 200 at the center in FIG. 3) positioned at the center among the display devices 200 constituting the multivision is out of order, the malfunctioning display device 200 needs to be disassembled. When the broken display device 200 is to be detached after forming the multivision, the second locking portion 121 enables the detachment without separating the adjacent display devices 200 from the support frame 120.

Specifically, when the support frame 120 is configured to move horizontally as in the embodiment of FIG. 2, the display devices 200 on the left or on the right of the display device 200 to be detached may be moved to the left or to the right at an interval. Accordingly, there is a space large enough to attach or detach the display device 200 on the left or on the right. However, interference between the upper and lower display devices 200 may cause a problem. The problem can be solved by hanging the display device 200 disposed above the display deice 200 to be detached on the second locking portion 121c (position C of FIG. 9). Specifically, when the display device 200 disposed above the display device 200 to be detached is placed at the position C, a vertical space is created, and the display device 200 to be detached may be detached through the insertion portion 121a without interfering with the display device 200 disposed above. With the configuration of the mounting hole 121, a margin space can be guaranteed when the display device 200 is attached or detached, thereby increasing work efficiency during assembling, disassembling and maintenance.

When the multivision is formed by using the universal stand 100 for multivision, the horizontal and the vertical positions of the plurality of the display devices 200 may be misaligned. Accordingly, after forming the multivision using the display devices 200, the horizontal and the vertical positions may be needed to be adjusted. To this end, the universal stand 100 includes an adjustment unit 140 which is disposed below the mounting hole 121 of the supporting frame 120 to adjust the position of the display device 200.

Figure 10:
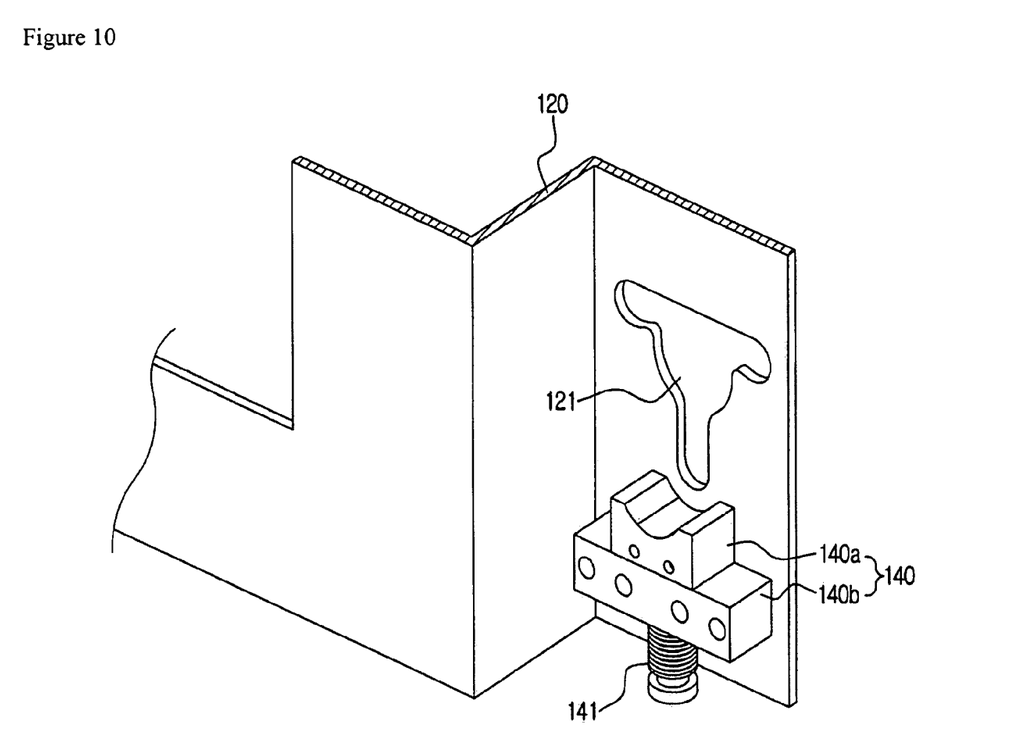
FIG. 10 is a schematic view illustrating an adjustment unit provided below the mounting hole.

FIG. 10 illustrates the adjustment unit which is disposed below the mounting hole 121 of the support frame 120. As illustrated in FIG. 10, the adjustment unit 140 includes a fixed portion 140b which is fixed on the support frame, and a vertical movement portion 140a which is mounted on the fixed portion 140b to move vertically.

The vertical movement portion 140a has a configuration in which it moves vertically on the fixed portion 140b as a screw portion 141c protruding downward from the fixed portion 140b is rotated. According to this embodiment, although not shown in the figure, a screw hole to which the screw portion 141c is screwed penetrates the center portion of the fixed portion 140b, and the screw portion 141c is mounted to penetrate the screw hole such that an upper end portion thereof rotates through a bearing at a lower surface of the vertical movement portion 140a. As the screw portion 141c rotates, the screw portion 141c moves vertically along the bolt hole of the fixed portion 140b, and correspondingly the vertical movement portion 140a which is fixed on the upper end of the screw portion 141c moves vertically.

Referring to FIG. 8, an upper surface of the vertical movement portion 140a of the adjustment unit 140 is in contact with the head portion 131 of the locking pin 130 which is fastened to the rear surface of the display device 200. Accordingly, when the vertical movement portion 140a moves vertically, the locking pin 130 correspondingly moves vertically. If a side of the mounted display device 200 is tilted downward, the vertical movement portion 140a on the tilted side may be adjusted to be lifted, so that the tilting may be corrected, and the position of the display device 200 may be adjusted to be horizontal.

The adjustment units 140 may be mounted only on the support frames 120 of the stand in the lowest row (for example, the lowest row in FIG. 3) among the universal stands 100 for the multivision forming the multivision. In this case, after assembling and arranging the stands, the adjustment units 140 are mounted only on the corresponding stands 100 in the lowest raw, which is inconvenient. Therefore, when the universal stand 100 for multivision is manufactured, it is preferable that the adjustment unit 140 be provided below each of the left and right mounting holes 121 provided at a lower portion of the support frame 120 among the mounting holes 121.

The support frame 120 can move horizontally or vertically. Accordingly, when the display device 200 mounted on the support frame 120 is not fixed but can be moved horizontally or vertically. Therefore, when the multivision is formed, in some cases, the display devices may not be closely arranged.

Figure 11:
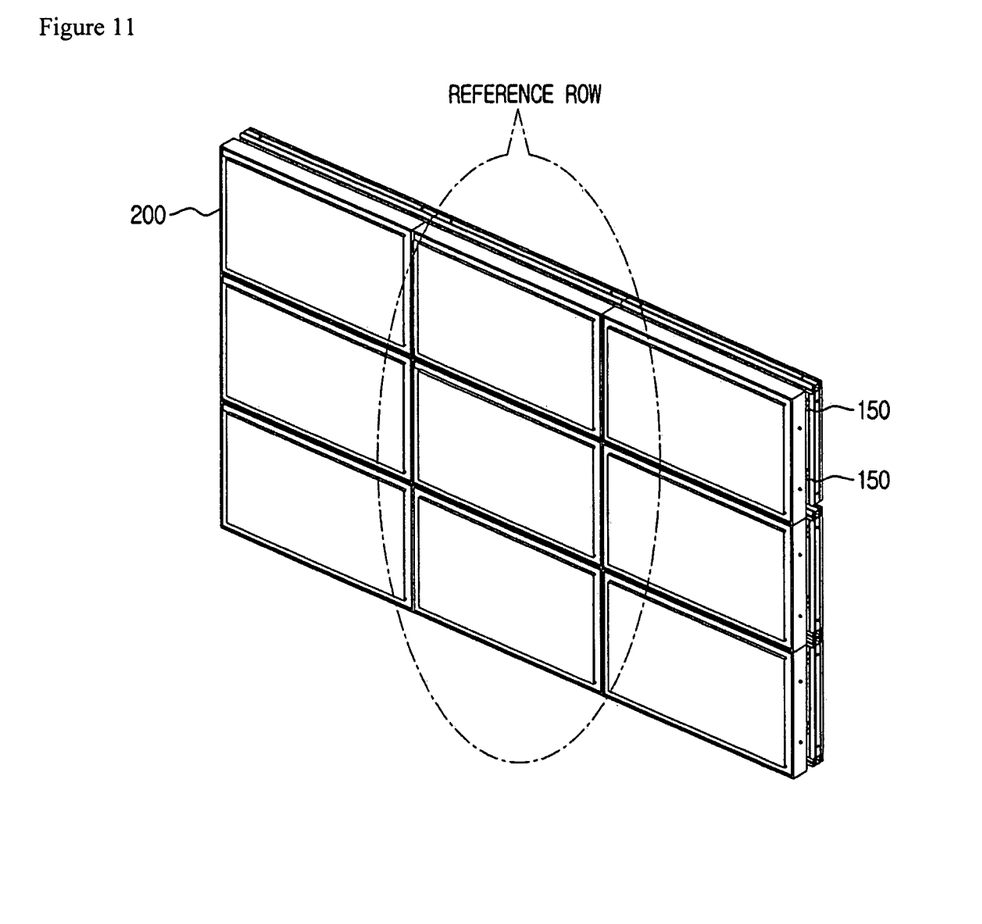
FIG. 11 is a view illustrating a state where a fixing bracket is fastened.

To prevent this, as illustrated in FIG. 11, a fixing bracket 150 is fastened between the base frame 110 of the stand (that is, the stand in rows on the left and right of a reference row) at the outermost periphery of the multivision and the display device 200, thereby preventing the display device 200 from deviating to the left or the right and maintaining a firm adhesion between the display devices 200.

The fixing bracket 150 is fastened between the universal stand 100 for the multivision and the display device 200, a side end portion thereof is configured to support the outermost display device 200 in an inward direction. The fixing bracket 150 may be fixed to the display device 200 by way of a screw or the like or interference fitting.

Figure 12:
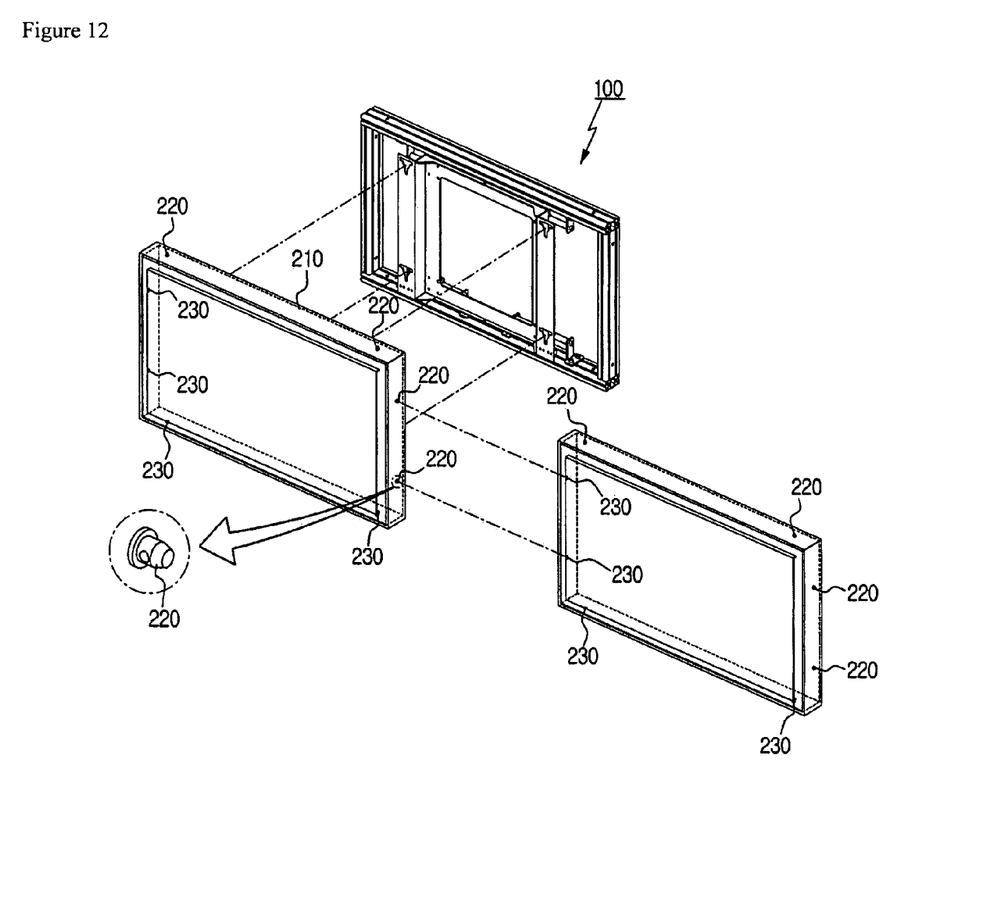
FIG. 12 is a perspective view illustrating a universal stand for multivision according to another embodiment.

FIG. 12 is a perspective view illustrating the universal stand according to still further another embodiment. As illustrated in FIG. 12, the universal stand 100 includes the rectangular base frame 110, the support frame 120 which is mounted on the base frame 110 to move horizontally or vertically, and a fixing frame 210 to which is a display panel is attached to configure the display device 200 and which is supported by the support frame 120.

As illustrated in FIG. 12, position determination protrusions 220 are formed on an upper surface and a side surface of the fixing frame 210 (on the right surface from a front view in FIG. 12), position determination notches 230 corresponding to the position determination protrusions 220 are formed on a lower surface and the other side surface (on left surface from the front view in FIG. 12). The position determination protrusion 220 and the position determination notch 230 are engaged with each other by a male-female engagement.

When the universal stands 100 are arranged for forming the multivision, the position determination protrusions 220 formed on the upper surface of the fixing frame 210 are inserted into the position determination notches 230 formed on the lower surface of another fixing frame 210 mounted on the aforementioned fixing frame 210, and the position determination protrusions 220 formed on the right surface of the fixing frame 210 are inserted to the position determination notches 230 formed on the left surface of another fixing frame 210 mounted to be adjacent to the right side of the aforementioned fixing frame 210. Accordingly, when the fixing frames 210 are closely mounted by moving the support frames 120 horizontally or vertically, the position determination protrusions are inserted into the position determination notches 230 of the adjacent fixing frame 210, thereby ensuring firm engagement between the fixing frames 210.

When the fixing frames 210 are fastened to each other, the positions of the position determination protrusions 220 and the position determination notches may be set to be aligned. Then, the fixing frames 210 may be precisely arranged without having to set the positions using measuring means.

Figure 13:
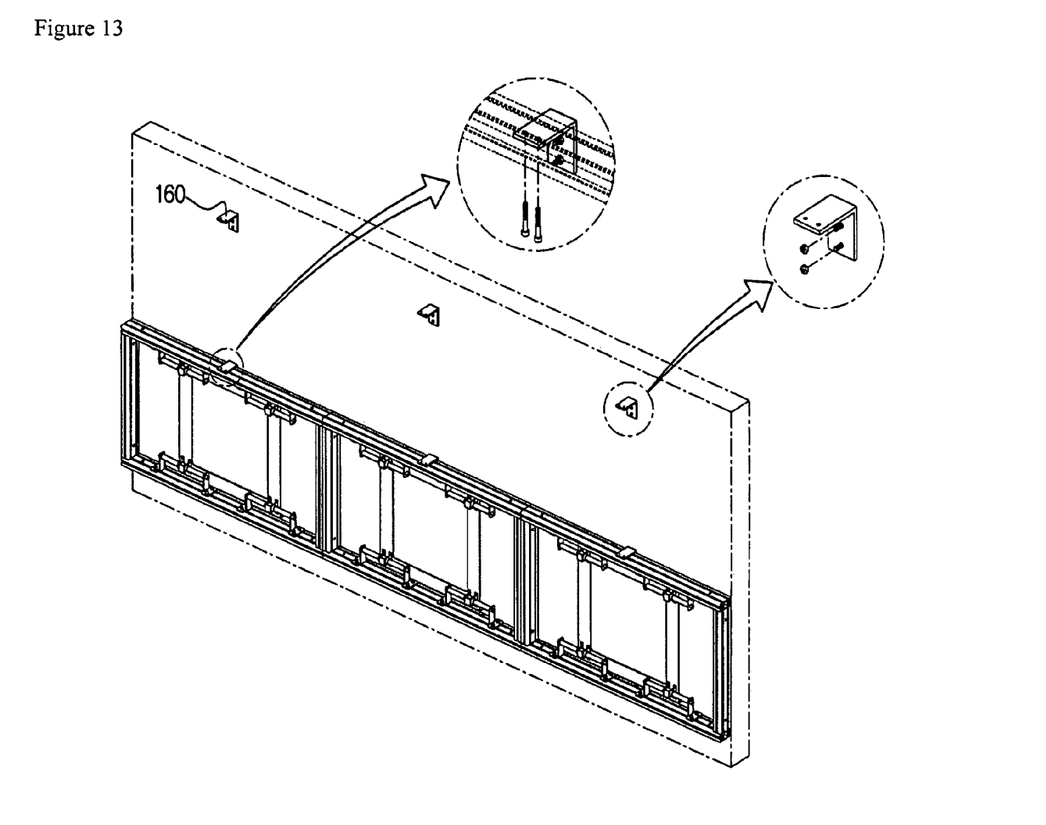
FIG. 13 is a schematic view illustrating an example of a universal stand for multivision mounted on a wall.

As illustrated in FIG. 13, the universal stands 100 for multivision according to the embodiments may be mounted on a wall by way of fixing members 160. In addition, the universal stands 100 according to the embodiments may be mounted on an additional support and may be mounted on a support to be disposed vertically in order to form a multivision that is vertically long as needed. In addition, the universal stands 100 may be mounted in various manners depending on mounting conditions of spaces.

Industrial Applicability

The universal stands for multivision according to the embodiments can be arranged and assembled depending on the number of the display devices constituting the multivision, so that various types of multivision can be more easily manufactured.

The universal stands for multivision according to the embodiments can be moved while the display devices are mounted. Therefore, individual assembling and disassembling is easy, and great effects can be exhibited with a small effort in terms of maintenance.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A universal stand for multivision which supports a display device to enable a plurality of display devices to be arranged to form a multivision, comprising:
   a base frame which is mounted on a wall or a support member; and
   a support frame which is connected to and supported by the base frame to move horizontally or vertically and on and by which the display device is mounted and supported,
   wherein the support frame includes a mounting hole into which a locking pin configured to protrude from a rear surface of the display device is inserted, in order to be engaged with the display device, and the mounting hole includes an insertion portion at the center, a first locking portion extending vertically from the insertion portion, and a second locking portion extending horizontally from the insertion portion to be perpendicular to the first locking portion,
   the display device can be moved horizontally or vertically with respect to the base frame by movement of the support frame with respect to the base frame,
   the display device can be moved horizontally or vertically with respect to the support frame without separating the display device from the support frame by movement of the locking pin between the first locking portion and the second locking portion.

2. The universal stand according to claim 1, wherein the base frame includes a slide bar extending horizontally or vertically, and the support frame includes a nut through which the slide bar is inserted to move linearly.

3. The universal stand according to claim 1, further comprising an adjustment unit which is mounted on the support frame for precisely adjusting a vertical position of the display device, wherein the adjustment unit includes:
   a fixing portion fixed below the mounting hole; and
   a vertical movement portion which is mounted on the fixing portion to move vertically and in contact with the locking pin of the display device.

4. The universal stand according to claim 1, further comprising a fixing bracket mounted in a gap between the display device and the support frame to fix the position of the display device.

5. The universal stand according to claim 2, further comprising a fixing bracket mounted in a gap between the display device and the support frame to fix the position of the display device.

6. The universal stand according to claim 3, further comprising a fixing bracket mounted in a gap between the display device and the support frame to fix the position of the display device.

7. A universal stand for multivision which supports a display device to enable a plurality of display devices to be arranged to form a multivision, comprising: a base frame which is mounted on a wall or a support member; a support frame which is connected to and supported by the base frame to move horizontally or vertically; and a fixing frame to which a display panel is attached and which is mounted on and supported by the support frame, the fixing frame can be moved horizontally or vertically with respect to the base frame by movement of the support frame with respect to the base frame; wherein position determination notches are formed on a side surface of the fixing frame, and position determination protrusions corresponding to the position determination notches are formed on the other side surface thereof.

* * * * *